United States Patent
Scheckelhoff et al.

(10) Patent No.: US 11,947,714 B2
(45) Date of Patent: Apr. 2, 2024

(54) SYSTEM AND METHOD FOR AUTHORIZING APPLIANCE ACCESS

(71) Applicant: Haier US Appliance Solutions, Inc., Wilmington, DE (US)

(72) Inventors: Ryan James Scheckelhoff, Louisville, KY (US); Richard Dean Suel, II, Louisville, KY (US); John Gilman Chapman, Jr., Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 193 days.

(21) Appl. No.: 17/521,936

(22) Filed: Nov. 9, 2021

(65) Prior Publication Data
US 2023/0143380 A1 May 11, 2023

(51) Int. Cl.
*G06F 21/86* (2013.01)
*H04W 12/03* (2021.01)
*H04W 12/0431* (2021.01)
*H04W 12/069* (2021.01)
(Continued)

(52) U.S. Cl.
CPC ............ *G06F 21/86* (2013.01); *H04W 12/03* (2021.01); *H04W 12/0431* (2021.01); *H04W 12/069* (2021.01); *H04W 12/08* (2013.01); *G06K 19/06028* (2013.01); *G06K 19/06037* (2013.01)

(58) Field of Classification Search
CPC . G06F 21/86; H04W 12/069; H04W 12/0431; H04W 12/03; H04W 12/08; G06K 19/06028; G06K 19/06037
See application file for complete search history.

(56) References Cited

U.S. PATENT DOCUMENTS

| 5,249,182 A | 9/1993 | Van Steenbrugge |
| 9,264,252 B2 | 2/2016 | Ebrom |
| 9,513,797 B2 | 12/2016 | Swink |

(Continued)

FOREIGN PATENT DOCUMENTS

| CN | 105350258 A | 2/2016 |
| CN | 106371872 A | 2/2017 |

(Continued)

OTHER PUBLICATIONS

Pătru, I.I., Carabas, M., Bărbulescu, M. and Gheorghe, L., Sep. 2016, Smart home IoT system. In 2016 15th RoEduNet Conference: Networking in Education and Research (pp. 1-6). IEEE. (Year: 2016).*

(Continued)

*Primary Examiner* — Luu T Pham
*Assistant Examiner* — Paul J Skwierawski
(74) *Attorney, Agent, or Firm* — Dority & Manning, P.A.

(57) ABSTRACT

An appliance includes an external communication port, such as an RJ45 port, and a wireless communication module in wireless communication with a remote server through an external network. A controller is configured to receive, using the wireless communication module, a secure unlock command from a remote server, the secure unlock command being generated when a remote service device transmits appliance identification data to the remote server, and unlock the external communication port to permit the remote service device to access operating software through the external communication port.

16 Claims, 5 Drawing Sheets

(51) Int. Cl.
*H04W 12/08* (2021.01)
*G06K 19/06* (2006.01)

(56) References Cited

U.S. PATENT DOCUMENTS

| | | | |
|---|---|---|---|
| 9,965,655 B1* | 5/2018 | Null | H04L 63/08 |
| 10,608,835 B2 | 3/2020 | Ha | |
| 10,871,952 B2 | 12/2020 | Wang | |
| 11,444,981 B1* | 9/2022 | Delaney | H04L 63/0236 |
| 2004/0125146 A1 | 7/2004 | Gerlach | |
| 2005/0222933 A1* | 10/2005 | Wesby | H04W 4/06 |
| | | | 705/36 R |
| 2009/0090137 A1 | 4/2009 | Jeong | |
| 2010/0217837 A1* | 8/2010 | Ansari | H04W 12/35 |
| | | | 709/224 |
| 2015/0295892 A1* | 10/2015 | Fox | H04L 63/0823 |
| | | | 726/15 |
| 2015/0296087 A1 | 10/2015 | Jeffery | |
| 2017/0185538 A1* | 6/2017 | Khan | G06F 21/88 |
| 2017/0337050 A1 | 11/2017 | Iwami | |
| 2019/0109723 A1 | 4/2019 | Ebrom | |
| 2020/0184803 A1 | 6/2020 | Holzinger | |
| 2020/0322338 A1 | 10/2020 | Peterson | |
| 2022/0167156 A1* | 5/2022 | Yasui | H04L 9/3268 |

FOREIGN PATENT DOCUMENTS

| | | | | |
|---|---|---|---|---|
| CN | 206591305 U | | 10/2017 | |
| CN | 108198298 A | | 6/2018 | |
| CN | 108352011 A | | 7/2018 | |
| EP | 3716182 A1 | * | 9/2020 | D06F 31/00 |
| EP | 3716182 A1 | | 9/2020 | |
| EP | 3672160 B1 | * | 9/2022 | H04L 12/2807 |
| WO | WO-2020160614 A1 | * | 8/2020 | G06F 16/381 |

OTHER PUBLICATIONS

Joshi SA, Poojari S, Chougale T, Shetty S, Sandeep MK. Home automation system using wireless network. In2017 2nd International Conference on Communication and Electronics Systems (ICCES) Oct. 19, 2017 (pp. 803-807). IEEE. (Year: 2017).*

Smart Home: Threats and Countermeasures, https://www.rambus.com/iot/smart-home, 4 pages.

David Coleman, Cloud-Managed Network Access Control for Dummies, 2021, 81 pages.

* cited by examiner

SYSTEM AND METHOD FOR AUTHORIZING APPLIANCE ACCESS

FIELD OF THE INVENTION

The present subject matter relates generally to appliances, or more specifically, to methods of operating commercial appliances to prevent unauthorized use or tampering.

BACKGROUND OF THE INVENTION

Certain conventional laundry appliances are becoming more connected with features that involve financial transactions or which may otherwise require owner approval to perform an operating cycle. For example, certain commercial appliances, such as washing machines and clothes dryers at a laundromat, might have currency-based operating systems that require a user to pay some form of currency before an operating cycle will begin. Similarly, purchasers of residential appliances may purchase an appliance with hopes of recouping some of the purchase price by charging for appliance usage. This may be common particularly in light of the rise of shared living arrangements, home rental services, and other shared appliance situations. For example, a homeowner who rents their house on a rental website might wish to charge renters for their use of the appliance, a tenant who purchases an appliance may wish to charge their roommates for appliance use, or an appliance owner may wish to generate a revenue steam from owned appliances in other situations as well.

Such pay-per-use commercial appliances may be exposed to an increased likelihood of appliance tampering. For example, conventional commercial appliances such as a washer or dryer may include an external service port, such as an RJ45 connection, that may be used for programming, data collection, and load control during development. This connection point can create a security risk in a commercial environment where the public or another unauthorized user has access to the appliance and RJ45 port. By contrast, in some cases, the owner or a service technician may need to use the RJ45 to update firmware on the appliance, e.g., when the update is not standard or is not widely distributed through a wireless network.

Accordingly, systems and methods for regulating access of an appliance through the service RJ45 port would be desirable. More specifically, a system for identifying and authenticating authorized versus unauthorized usage of an appliance or access to the appliance operating software would be particularly beneficial.

BRIEF DESCRIPTION OF THE INVENTION

Advantages of the invention will be set forth in part in the following description, or may be apparent from the description, or may be learned through practice of the invention.

In one exemplary embodiment, an appliance is provided including a cabinet, an external communication port positioned on the cabinet, a wireless communication module in wireless communication with a remote server through an external network, and a controller in operative communication with the external communication port and the wireless communication module. The controller is configured to receive, using the wireless communication module, a secure unlock command from a remote server, the secure unlock command being generated when a remote service device transmits appliance identification data to the remote server, and unlock the external communication port to permit the remote service device to access operating software through the external communication port.

In another exemplary embodiment, a method of operating an appliance is provided. The appliance includes an external communication port, a wireless communication module in wireless communication with a remote server through an external network, and a controller in operative communication with the external communication port and the wireless communication module. The method includes receiving, using the wireless communication module, a secure unlock command from the remote server, the secure unlock command being generated when a remote service device transmits appliance identification data to the remote server, and unlocking the external communication port to permit the remote service device to access operating software through the external communication port.

In another exemplary embodiment, a method of using a remote server to authenticate access to an external communication port of an appliance is provided. The method includes receiving a request to access operating software of the appliance, the request including appliance identification data from a remote service device, verifying the authenticity of the remote service device, and transmitting a secure unlock command to the appliance through a wireless communication module, the secure unlock command requesting that the appliance unlock an external communication port to permit the remote service device to access the operating software.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
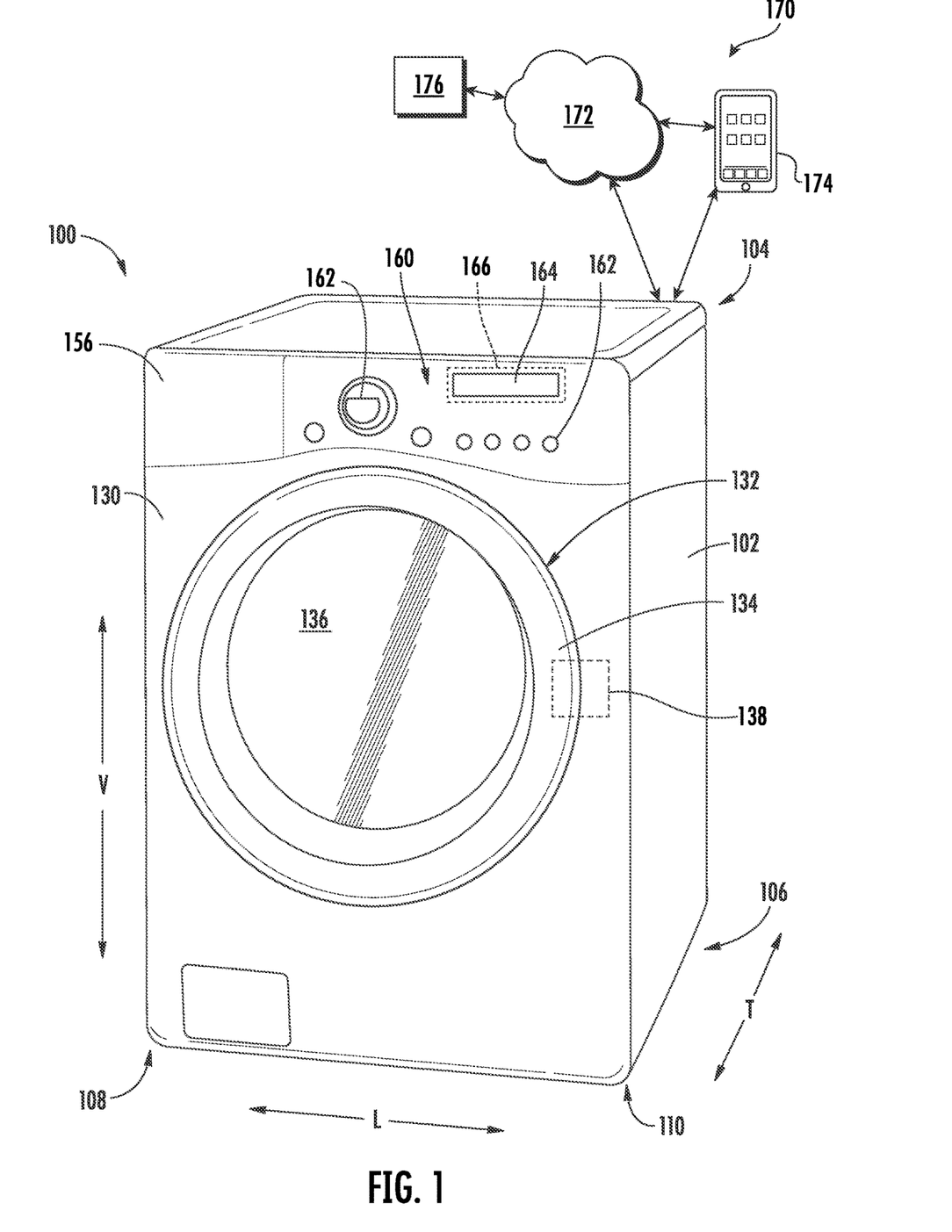
FIG. 1 provides a perspective view of an exemplary washing machine appliance according to an exemplary embodiment of the present subject matter.
Figure 2:
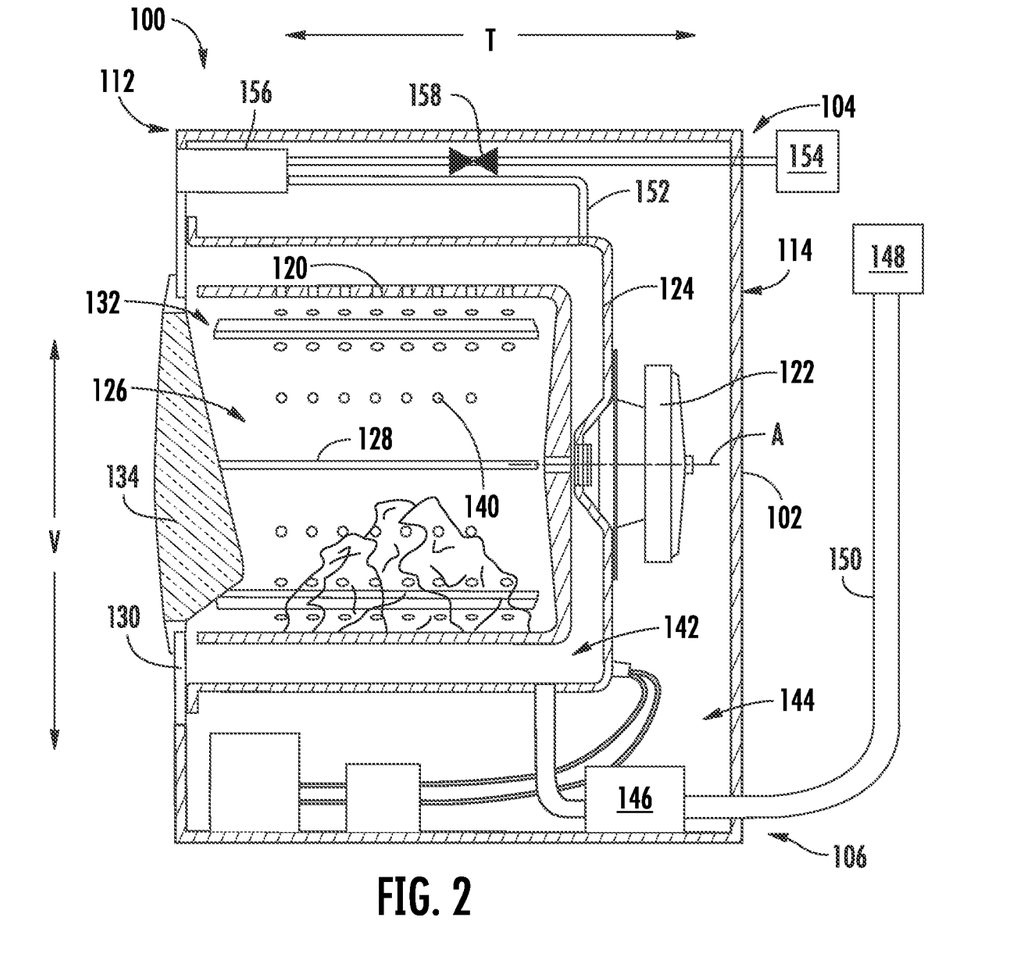
FIG. 2 provides a side cross-sectional view of the exemplary washing machine appliance of FIG. 1.

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined.

According to exemplary embodiments, washing machine appliance 100 includes a cabinet 102 that is generally configured for containing and/or supporting various components of washing machine appliance 100 and which may also define one or more internal chambers or compartments of washing machine appliance 100. In this regard, as used herein, the terms "cabinet," "housing," and the like are generally intended to refer to an outer frame or support structure for washing machine appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of washing machine appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing washing machine appliance 100.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments. Washing machine appliance 100 may further include a latch assembly 138 (see FIG. 1) that is mounted to cabinet 102 and/or door 134 for selectively locking door 134 in the closed position and/or confirming that the door is in the closed position. Latch assembly 138 may be desirable, for example, to ensure only secured access to wash chamber 126 or to otherwise ensure and verify that door 134 is closed during certain operating cycles or events.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

Washing machine appliance 100 may further include a wash fluid dispenser that is generally configured for dispensing a flow of water, wash fluid, etc. into wash tub 124. For example, a spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

Referring again to FIG. 1, washing machine appliance 100 may include a control panel 160 that may represent a general-purpose Input/Output ("GPIO") device or functional block for washing machine appliance 100. In some embodiments, control panel 160 may include or be in operative communication with one or more user input devices 162, such as one or more of a variety of digital, analog, electrical, mechanical, or electro-mechanical input devices including rotary dials, control knobs, push buttons, toggle switches, selector switches, and touch pads. Additionally, washing machine appliance 100 may include a display 164, such as a digital or analog display device generally configured to provide visual feedback regarding the operation of washing machine appliance 100. For example, display 164 may be provided on control panel 160 and may include one or more status lights, screens, or visible indicators. According to exemplary embodiments, user input devices 162 and display 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Washing machine appliance 100 may further include or be in operative communication with a processing device or a controller 166 that may be generally configured to facilitate appliance operation. In this regard, control panel 160, user input devices 162, and display 164 may be in communication with controller 166 such that controller 166 may receive control inputs from user input devices 162, may display information using display 164, and may otherwise regulate operation of washing machine appliance 100. For example, signals generated by controller 166 may operate washing machine appliance 100, including any or all system components, subsystems, or interconnected devices, in response to the position of user input devices 162 and other control commands. Control panel 160 and other components of washing machine appliance 100 may be in communication with controller 166 via, for example, one or more signal lines or shared communication busses. In this manner, Input/Output ("I/O") signals may be routed between controller 166 and various operational components of washing machine appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 166 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 166 may be operable to execute programming instructions or micro-control code associated with an operating cycle of washing machine appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 166 as disclosed herein is capable of and may be operable to perform any methods, method steps, or portions of methods as disclosed herein. For example, in some embodiments, methods disclosed herein may be embodied in programming instructions stored in the memory and executed by controller 166.

The memory devices may also store data that can be retrieved, manipulated, created, or stored by the one or more processors or portions of controller 166. The data can include, for instance, data to facilitate performance of methods described herein. The data can be stored locally (e.g., on controller 166) in one or more databases and/or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 166 may further include a communication module or interface that may be used to communicate with one or more other component(s) of washing machine appliance 100, controller 166, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Referring again to FIG. 1, a schematic diagram of an external communication system 170 will be described according to an exemplary embodiment of the present subject matter. In general, external communication system 170 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 170 may be used to transfer data or other information to improve performance of one or more external devices or appliances and/or improve user interaction with such devices.

For example, external communication system 170 permits controller 166 of washing machine appliance 100 to communicate with a separate device external to washing machine appliance 100, referred to generally herein as an external device 174. As described in more detail below, these communications may be facilitated using a wired or wireless connection, such as via a network 172. In general, external device 174 may be any suitable device separate from washing machine appliance 100 that is configured to provide and/or receive communications, information, data, or commands from a user. In this regard, external device 174 may be, for example, a personal phone, a smartphone, a tablet, a laptop or personal computer, a wearable device, a smart home system, or another mobile or remote device.

In addition, a remote server 176 may be in communication with washing machine appliance 100 and/or external device 174 through network 172. In this regard, for example, remote server 176 may be a cloud-based server 176, and is thus located at a distant location, such as in a separate state, country, etc. According to an exemplary embodiment, external device 174 may communicate with a remote server 176 over network 172, such as the Internet, to transmit/receive data or information, provide user inputs, receive user notifications or instructions, interact with or control washing machine appliance 100, etc. In addition, external device 174 and remote server 176 may communicate with washing machine appliance 100 to communicate similar information.

In general, communication between washing machine appliance 100, external device 174, remote server 176, and/or other user devices or appliances may be carried using any type of wired or wireless connection and using any suitable type of communication network, non-limiting examples of which are provided below. For example, external device 174 may be in direct or indirect communication with washing machine appliance 100 through any suitable wired or wireless communication connections or interfaces, such as network 172. For example, network 172 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

During operation of washing machine appliance 100, laundry items are loaded into wash basket 120 through opening 132, and washing operation is initiated through operator manipulation of input selectors 162. Wash tub 124 is filled with water, detergent, and/or other fluid additives, e.g., via spout 152 and/or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through opening 132.

Figure 4:
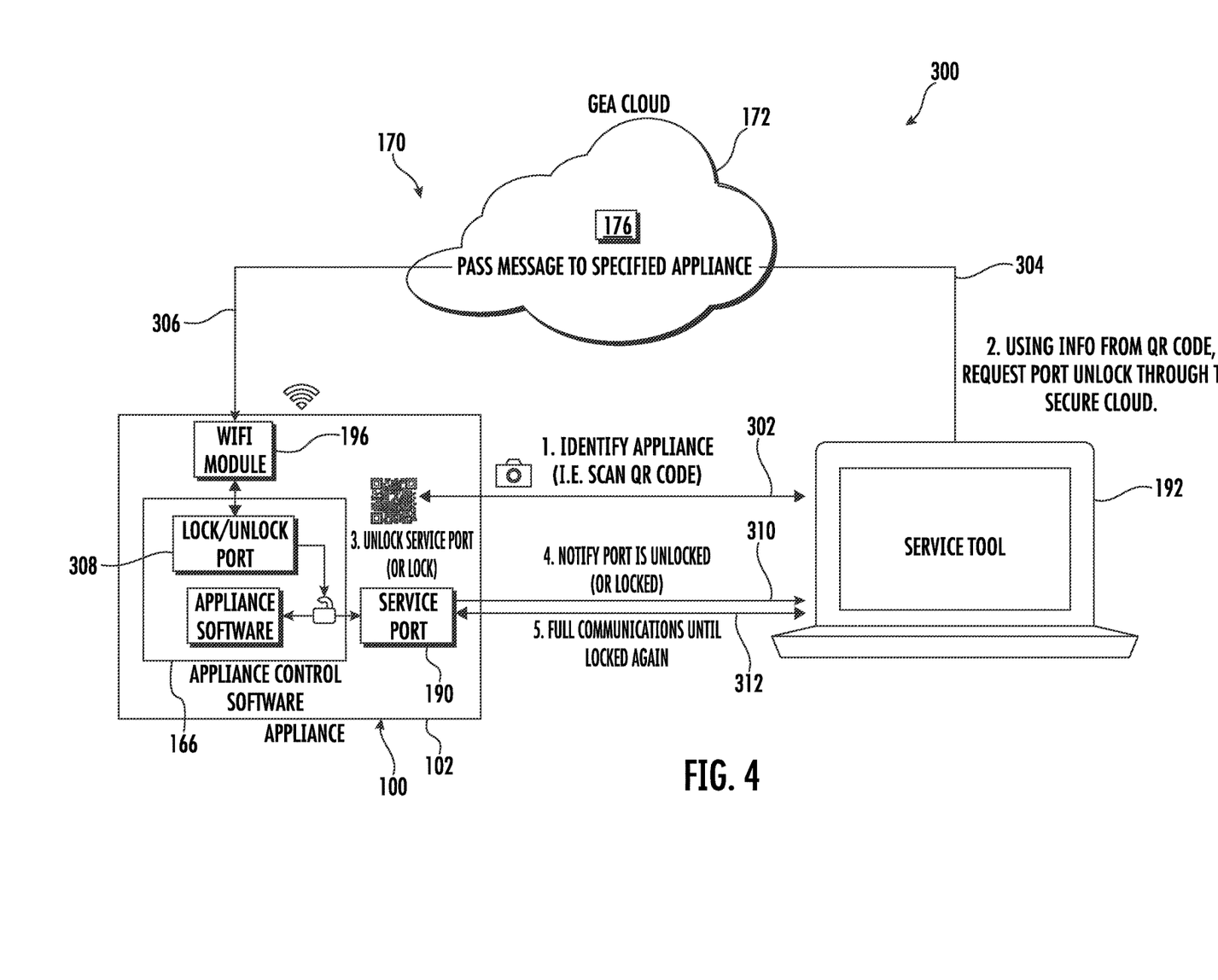
FIG. 4 provides a schematic representation of an appliance software access process using an appliance external communication system according to an exemplary embodiment of the present subject matter.
Figure 5:
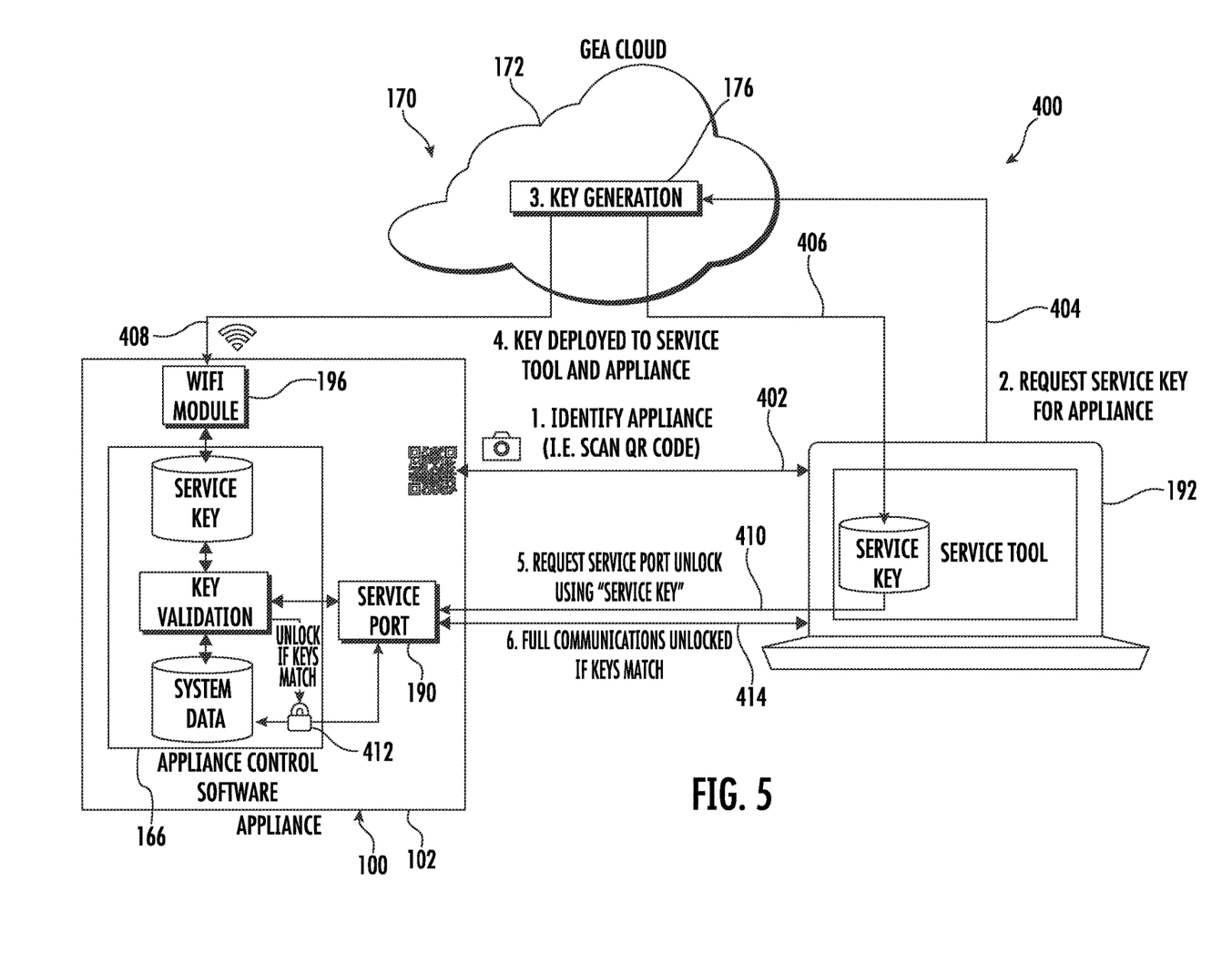
FIG. 5 provides a schematic representation of another appliance software access process using an appliance external communication system according to an exemplary embodiment of the present subject matter.

Referring briefly to FIGS. 4 and 5, washing machine appliance 100 may be coupled to a remote server and/or a remote service device using any suitable wired or wireless connection. Specifically, as illustrated, washing machine appliance 100 may generally include an external communication port 190 that is positioned on cabinet 102 or which is otherwise accessible through cabinet 102. In general, external communication port 190 may be any suitable communications interface for interacting with an external source or device (identified herein generally as remote service device 192). For example, according to exemplary embodiments, external communication port 190 may be an RJ45 network interface, a universal serial bus ("USB") interface, or any other suitable communications interface. According to exemplary embodiments, external communication port 190 is directly electrically and communicatively coupled to an appliance control board (e.g., controller 166).

External communication port 190 may generally be configured for facilitating wired communications between an external device, such as remote service device computer 192 and the associated appliance (e.g., such as washing machine appliance 100). For example, external communication port 190 may be used facilitate appliance programming, to perform appliance maintenance, to adjust operating parameters, to modify the operating software, or to perform any other action using washing machine appliance 100. While common uses of external communication port 190 may include appliance maintenance or manufacturer programming, this port may also inadvertently provide a security weakness or potential access point that may be used by hackers or other unauthorized user for nefarious or unauthorized purposes. In this regard, as noted above, an unauthorized user may plug in an external device (such as a computer) to the RJ45 external communication port 190 using an electrical cable (not shown). In this manner, with the proper knowledge and skill, it may be possible for the unauthorized user to obtain undesirable access to the appliance control board.

Referring still to FIG. 1, washing machine appliance 100 may be in operative communication with a remote device such as a cell phone or other remote device 174 via a network 172. In addition, network 172 may contain or be in communication with a remote server 176. According to exemplary embodiments, external communication system 170 may be used to authorize access to the control software of the appliance, e.g., to perform specific operating cycles, make appliance adjustments, authorize credits, manage a payment system, charge for operation, or perform other suitable commercial operations using washing machine appliance 100.

Notably, as explained briefly above, appliances such as washing machine appliance 100 may commonly be involved in financial transactions, such as where the owner of the appliance has placed the appliance in a shared environment where people may pay to use one or more features of the appliance. Notably, consumers may try to tamper with these appliances in order to perform appliance operations, enable features, or otherwise cause the appliance to perform certain functions for free. For example, a consumer may make unauthorized access to washing machine appliance 100, e.g., via external communication port 190, in order to obtain such appliance access and control. Accordingly, aspects of the present subject matter are directed to systems and methods for preventing such unauthorized appliance tampering.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances. In addition, aspects of the present subject matter may be utilized in any other suitable appliance, particularly those utilized in a commercial setting. For example, aspects of the present subject matter may be utilized in refrigerators, ovens, dishwashers, etc.

Now that the construction of washing machine appliance 100 and the configuration of controller 166 and external communication system 170 have been presented according to exemplary embodiments, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as vertical axis washing machine appliances. Moreover, method 200 may be used to prevent unauthorized access or use of any appliance, particularly commercial appliances. In exemplary embodiments, the various method steps as disclosed herein may be performed by controller 166 or a separate, dedicated controller.

According to various embodiments of the present subject matter, method 200 is generally intended to prevent unauthorized access to an appliance such as washing machine appliance 100. For example, washing machine appliance 100 may include an external communication port, such as an RJ 45 port, through which authorized maintenance technicians may access and manipulate appliance operating software. However, this external communication port may also be exploited by parties seeking unauthorized access to the operating software, e.g., to adjust operating parameters, initiate unpaid operating cycles, or have other undesirable interactions with washing machine appliance 100. Method 200 is generally directed to methods for restricting unauthorized access to washing machine appliance 100. Although an exemplary implementation of method 200 is described below, it should be appreciated that variations and modifications to this method may be made while remaining within the scope of the present subject matter.

Figure 3:
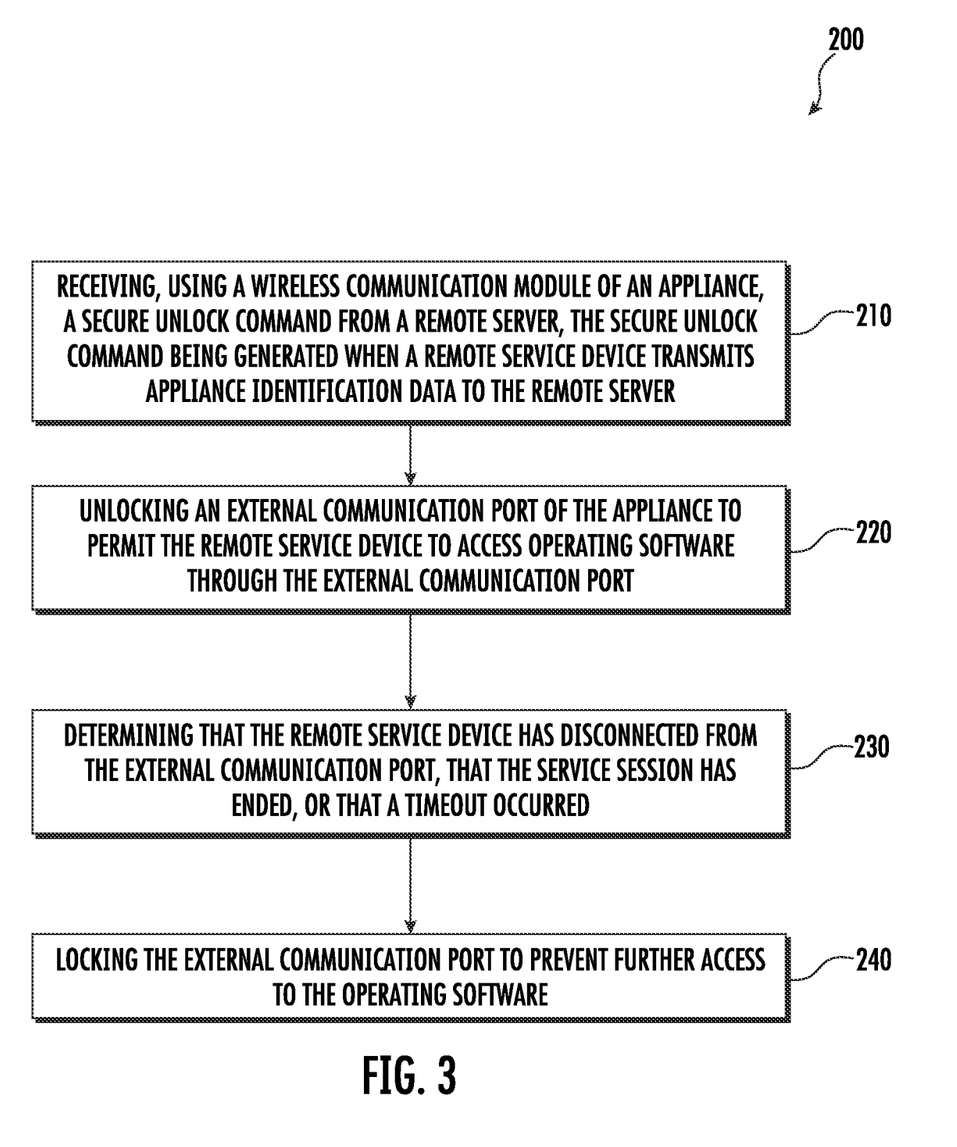
FIG. 3 illustrates a method for operating a washing machine appliance in accordance with one embodiment of the present disclosure.

Referring now to FIG. 3, method 200 includes, at step 210, receiving, using a wireless communication module of the appliance, a secure unlock command from a remote server. In this regard, for example, a wireless communication module 196 of controller 166 of washing machine appliance 100 may be in secure wireless communication with a remote server 176 through network 172. Remote server 176 may generate the secure unlock command that is transmitted to washing machine appliance 100 in a secure, encrypted manner. Specifically, as described in more detail below, this secure unlock command may be a request to unlock an external communication port 190 of washing machine appliance 100 to facilitate interaction with a maintenance technician (e.g., via remote service device 192) or otherwise permit manipulation of appliance operating software through external communication port 190.

In general, the secure unlock command may be generated in a variety of circumstances where authentic, authorized interaction with the external communication port 190 is desired. For example, according to exemplary embodiments, the secure unlock command may be generated when a remote service device belonging to an authorized maintenance technician transmits an unlock request to remote server 176 along with appliance identification data suitable for identifying the appliance to be serviced. Once the appliance is properly identified using the appliance identification data and the requesting party is authorized or authenticated, remote server 176 may send the secure unlock command.

As used herein, the term "appliance identification data" is generally intended to refer to any identifying information or data related to an appliance to be serviced or an appliance where interaction with an external communication port is desired. For example, the appliance identification data may include one or more of the appliance model number, serial number, or other unique identifying code. Other means for identifying appliances and other appliance identification data may be used while remaining within scope the present subject matter.

In addition, it should be appreciated that the appliance identification data may be obtained by parties seeking access to the appliance in any suitable manner. For example, continuing the example above, the maintenance technician or remote service device 192 may obtain the appliance identification data by inspecting washing machine appliance 100. In this regard, the appliance identification data may be any suitable visual identifier displayed on a cabinet 102, such as a barcode, a QR code, or the alphanumerical serial number of the appliance. In addition, or alternatively, remote service device 192 may obtain the appliance identification data from the maintenance request. In this regard, when the owner of washing machine appliance 100 requests a maintenance visit, they may input suitable appliance identification data along with that request. Other suitable manners of obtaining the appliance identification data are possible and within the scope of the present subject matter.

Once the appliance identification data and request from the remote service device 192 are obtained, remote server 176 may perform an authentication or authorization process whereby the remote service device 192 and/or the maintenance technician or other party seeking access to the external communication port 190 are verified as approved parties. For example, remote server 176 may crosscheck the remote service device 192 with a list of authorized accessing parties, may ensure that the maintenance visit was a requested or scheduled maintenance visit, or may authorize the accessing party in any other suitable manner.

Step 220 includes unlocking an external communication port of the appliance to permit the remote service device to access operating software through the external communication port. In this regard, once washing machine appliance 100 receives the secure unlock command from remote server 176, it may unlock external communication port 190 to permit interaction between the appliance and external parties. Although the terms "lock" and "unlocked" are used herein to describe the states of external communication port 190, it should be appreciated that these states are not necessarily intended to mean a physical locking of the port but instead are intended to refer to the ability of an external party to access washing machine appliance 100 through external communication port 190. For example, if external communication port 190 is in a locked state, remote service device 192 (or other devices) may transmit data or requests to washing machine appliance 100, but these requests may simply be ignored or discarded.

According to exemplary embodiments, remote server 176 and/or washing machine appliance 100 may provide a notification when the external communication port 190 is unlocked an available for interaction. For example, display 164 of washing machine appliance may provide an audible notification or display a message indicating that external communication port 190 is unlocked and awaiting communications or data. In addition, or alternatively, remote server 176 may transmit a notification to a remote service device 192 when the secure unlock command is sent to the washing machine appliance 100 or when the external communication port 190 has been unlocked.

Notably, method 200 may further include steps for locking external communication port 190 to prevent unauthorized access after an authorized maintenance session. In this regard, step 230 may include determining that the remote service device has disconnected from the external communication port, that the service session has ended, or that a timeout occurred. Moreover, step 240 may include locking the external communication port to prevent further access to the operating software. In this regard, if washing machine appliance 100 detects that remote service device 192 has removed the electrical cable or connector from external communication port 190, it may assume that the service session has ended and may lock the external communication port 190 to prevent further interaction with the operating software. Alternatively, an end service notification may be transmitted from remote service device 192 directly to washing machine appliance 100 or to the remote server 176 when the authenticated service session has ended, after which washing machine appliance 100 may lock the external communication port 190. According to still other embodiments, washing machine appliance 100 may be configured to lock the external communication port 190 a predetermined amount of time after unlocking the external communication port 190 (e.g., after 10 minutes, 30 minutes, 1 hour, 24 hours, etc.).

FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using washing machine appliance 100 as an example, it should be appreciated that this method may be applied to the operation of any other appliance, particularly any commercial appliance.

Referring now to FIG. 4, a schematic system and communication protocols for implementing an exemplary method 300 of authenticating a maintenance access request and unlocking an external communication port to permit access by a maintenance computer will be described. For purposes of discussion, FIG. 4 illustrates interactions with washing machine appliance 100, so like references may be used to refer to the same or similar features.

As illustrated, when remote service device 192 arrives on site to perform a maintenance visit for washing machine appliance 100, at step 302, the service tool or the maintenance technician may directly inspect washing machine appliance 100 for appliance identification data. Specifically, according to the illustrated embodiment, remote service device 192 may scan the QR code on cabinet 102 of washing machine appliance 100 to obtain the appliance identification data. According to alternative embodiments, remote service device 192 may obtain the appliance identification data in any other suitable manner, e.g., such as directly through a maintenance request order.

Step 304 may include transmitting to remote server 176 via a network 172 a request to unlock external communication port 190 of washing machine appliance 100. Remote server 176 may authenticate remote service device 192 and at step 306, transmit the secure unlock command directly to wireless communication module 196 of washing machine appliance 100. Notably, this transmission may be encrypted and secure such that the potential for tampering is negligible. Upon receiving the secure unlock command, controller 166 may unlock the external communication port 190 at step 308.

According to exemplary embodiments, external communication port 190, washing machine appliance 100, and/or remote server 176 may, at step 310, transmit a notification to remote service device 192 when external communication port 190 is unlocked. Step 312 may include facilitating full communications between washing machine appliance 100 and remote service device 192 through external communication port 190, e.g., to facilitate a maintenance process, to access operating software, to adjust operating parameters, or to make any other changes interactions with controller 166 of washing machine appliance 100.

Referring now to FIG. 5, a schematic system and communication protocols for implementing an exemplary method 400 of authenticating a maintenance access request and unlocking an external communication port to permit access by a maintenance computer will be described. For purposes of discussion, FIG. 5 illustrates interactions with washing machine appliance 100, so like references may be used to refer to the same or similar features. In addition, method 400 may include many of the same or similar steps as methods 200 and 300.

As shown, method 400 may include, at step 402, obtaining appliance identification data of washing machine appliance 100 (e.g., in a manner similar to step 302). Step 404 may include transmitting the appliance identification data along with a request for a service key that permits access to external communication port 190. Upon receiving the request from an authenticated remote service device 192, remote server 176 may generate an encrypted service key. This key may be automatically generated upon request, may be a rolling key that is reproduced at predetermined time periods, may be associated with one appliance or a suite of appliances belonging to the same owner, or may be generated in any other suitable manner. Step 406 may include transmitting the encrypted service key directly to remote service device, e.g., through an encrypted connection. In addition, step 408 may include transmitting the encrypted service key directly to washing machine appliance 100, e.g., via wireless communication module 196.

Step 410 may include transmitting from the remote service device 192 the encrypted service key along with the request to access the external communication port 190 directly to washing machine appliance 100. Upon receiving the access request and encrypted service key, washing machine appliance 100 may compare the encrypted service key received from remote service device 192 with the encrypted service key received from remote server 176. If these keys do not match, washing machine appliance 100 may deny access to the external communication port 190. By contrast, if the encrypted service keys match, step 412 may include unlocking external communication port and step 414 may include permitting full communication between remote service device 192 and operating software of washing machine appliance 100.

Aspects of the present subject matter are generally directed to a washing machine providing a means for securing an external communication port/bus after production. For example, appliances commonly include an external RJ45 port that is accessible and is commonly used for engineering development such as software updates, reading data and controlling the appliance for product development, production test loop, or software qualification. Accordingly, this external port is important to the development lifecycle of an appliance. However, this port also creates a security concern after the product has been produced and is out in the field, specifically when used in a commercial field. In this regard, the washing machines built with the external RJ45 used for development, testing, and manufacturing process creates a security risk when used for paid services and is located in a public setting. However, eliminating RJ45 would create a manufacturing and development issues and so a solution is desirable to properly secure the external communication bus after production.

Accordingly, aspects of the present subject matter are generally directed to solutions for securing an appliance external communication bus after production. This solution may include halting the communication of firmware through the external communication bus by blacklisting commands, dropping messages, or disabling the communication bus altogether. Securing the external communication bus can be done at runtime using any combinations of conditions like number of cycles completed, a predetermined time after power up, or storing a command sent during the appliance manufacturing process or control board manufacturing process in a non-volatile memory, or upon connection of the washing machine to the cloud, or entering key sequence through an user interface that will be performed during product installation or by owner action through an app or cloud portal.

In addition, aspects of the present subject matter are directed to methods for remotely unlocking the washing machine external communication bus through a secure remote server, e.g., owned, operated, or controlled by the appliance manufacturer. Specifically, the secure remote server may have a secure, encrypted connection with the appliance wireless communication module. The external communication port may remain locked until an unlock command is securely sent from the secure remote server to the appliance. For example, the remote server may send the unlock command upon verifying the authenticity of the actor and purpose of accessing the appliance, such as when a service technician needs access to the appliance software to perform a software update.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
a cabinet;
an external communication port positioned on the cabinet;
a wireless communication module in wireless communication with a remote server through an external network; and
a controller in operative communication with the external communication port, the wireless communication module, and a remote service device, the controller being configured to:
receive, using the wireless communication module, a secure unlock command from a remote server, the secure unlock command being generated when the remote service device transmits appliance identification data to the remote server;
unlock the external communication port to permit the remote service device to access operating software through the external communication port, and
notify the remote service device when the external communication port has been unlocked,
wherein the controller is in operative communication with the remote service device, the controller further being configured to:
determine that the remote service device has disconnected from the external communication port; and
lock the external communication port to prevent further access to the operating software;
wherein the appliance is a laundry appliance.

2. The appliance of claim 1, wherein the appliance identification data comprises at least one of a serial number or a model number of the appliance.

3. The appliance of claim 1, wherein the appliance identification data is available as a bar code, a QR code, or another visible identifier displayed on the cabinet.

4. The appliance of claim 1, wherein the appliance identification data is transmitted to the remote service device along with a maintenance request.

5. The appliance of claim 1, wherein the controller is in operative communication with the remote service device, the controller further being configured to:
receive an end service notification from the remote service device; and
lock the external communication port to prevent further access to the operating software.

6. The appliance of claim 1, wherein the controller is further configured to:
lock the external communication port a predetermined amount of time after unlocking the external communication port.

7. The appliance of claim 1, wherein the external communication port is an RJ45 port.

8. The appliance of claim 1, wherein the appliance is a washing machine appliance, a dryer appliance, or a combination washer/dryer appliance.

9. A method of operating an appliance, the appliance comprising an external communication port, a wireless communication module in wireless communication with a remote server through an external network, and a controller in operative communication with the external communication port and the wireless communication module, the method comprising:
receiving, using the wireless communication module, a secure unlock command from the remote server, the secure unlock command being generated when a remote service device transmits appliance identification data to the remote server;
unlocking the external communication port to permit the remote service device to access operating software through the external communication port,
notifying the remote service device when the external communication port has been unlocked;
determining that the remote service device has disconnected from the external communication port; and
locking the external communication port to prevent further access to the operating software;
wherein the appliance is a laundry appliance.

10. The method of claim 9, wherein the appliance identification data comprises at least one of a serial number or a model number of the appliance and is available as a bar code, a QR code, or another visible identifier displayed on a cabinet of the appliance.

11. The method of claim 9, further comprising:
receiving an end service notification from the remote service device; and
locking the external communication port to prevent further access to the operating software.

12. The method of claim 9, further comprising:
locking the external communication port a predetermined amount of time after unlocking the external communication port.

13. A method of using a remote server to authenticate access to an external
communication port of an appliance, the method comprising:
receiving a request to access operating software of the appliance, the request including appliance identification data from a remote service device;
verifying the authenticity of the remote service device;
transmitting a secure unlock command to the appliance through a wireless communication module, the secure unlock command requesting that the appliance unlock an external communication port to permit the remote service device to access the operating software;
determining that the remote service device has disconnected from the external communication port; and
locking the external communication port to prevent further access to the operating software;
wherein the appliance is a laundry appliance.

14. The method of claim 13, wherein verifying the authenticity of the remote service device comprises:
transmitting a first service key to the remote service device; and transmitting a second service key to the appliance, wherein the appliance unlocks the external communication port only if the first service key is communicated to the appliance by the remote service device and the first service key matches the second service key.

15. The method of claim 14, further comprising:

notifying the remote service device that the second service key has been transmitted to the appliance for comparison with the first service key.

16. The method of claim 13, further comprising:

receiving an end service notification from the remote service device; and transmitting a command to the appliance to lock the external communication port to prevent further access to the operating software.

* * * * *